United States Patent

[11] 3,608,076

[72] Inventors Milton David Heller
   New City;
   John Anthony Coppola, Suffern; Seymour Bernstein, New City, all of N.Y.
[21] Appl. No. 865,961
[22] Filed Oct. 13, 1969
[45] Patented Sept. 21, 1971
[73] Assignee American Cyanamid Company
   Stamford, Conn.

[54] USE OF STEROID DERIVATIVES AS ANTIFERTILITY AGENTS
4 Claims, No Drawings

[52] U.S. Cl. .................................................. 424/241
[51] Int. Cl. .......................................... A61k 27/00
[50] Field of Search ......................................... 424/241

OTHER REFERENCES
Kawakami et al., Endocrinology, Vol. 80, No. 5 pp. 857–871, 1967 (Copy in POSL).

[56] References Cited
FOREIGN PATENTS
1,060,632  3/1967  Great Britain.
1,081,358  8/1967  Great Britain.

Primary Examiner—Richard L. Huff
Attorney—Ernest Y. Miler

ABSTRACT: Derivatives of certain 16α, 17α-dihydroxysteroids of the pregnane series are described. These steroids are useful for controlling fertility in warmblooded female animals.

USE OF STEROID DERIVATIVES AS ANTIFERTILITY AGENTS

This invention relates to the use of derivatives of chloropregnane acetonides as antifertility agents.

The compounds useful as antifertility agents may be illustrated by the following formula:

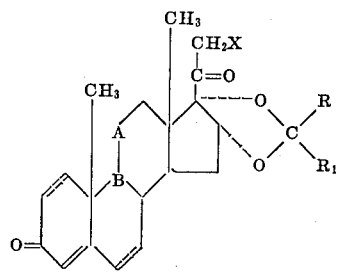

wherein X is selected from the group consisting of hydrogen and chlorine;

is a trivalent radical selected from the group consisting of

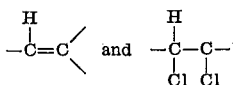

R is lower alkyl; $R_1$ is selected from the group consisting of lower alkyl and phenyl and $=$ indicates a double or single bond. Lower alkyl is intended to include those having one to four carbon atoms. The above-described active components form a part of novel compositions containing a pharmaceutically acceptable carrier.

Some of the active components of the present invention can be prepared, for example, by the methods described in U.S. Pat. No. 3,211,727, issued Oct. 12, 1965. Others are prepared by methods herein described.

Among the active components which are particularly useful in the present invention are, for example, $9\alpha, 11\beta 21$-trichloro-$16\alpha, 17\alpha$-isopropylidenedioxypregn-4-ene-3, 20-dione; $9\alpha, 11\beta$-dichloro-$16\alpha, 17\alpha$-isopropylidenedioxypregna-1,4-diene-3,20-dione; $9\alpha, 11\beta, 21$-trichloro-$16\alpha, 17\alpha$-isopropylidenedioxypregna-1,4-diene-3,20-dione; $9\alpha, 11\beta, 21$-trichloro-$16\alpha, 17\alpha$-isopropylidenedioxypregna-1,4,6-triene-3,20-dione; 21-chloro-$16\alpha, 17\alpha$-isopropylidenedioxypregna-1,4,6,9(11)-tetraene-3,20-dione; $16\alpha, 17\alpha$-(2'-butylidenedioxy)-$9\alpha, 11\beta, 21$-trichloropregna-1,4,6-triene-3,20-dione and the acetophenide derivative of $9\alpha, 11\beta, 21$-trichloro-$16\alpha, 17\alpha$-dihydroxypregna-1,4,6-triene-3,20-dione.

The compositions of this invention provide a convenient mode of contraception through the use of an orally administered composition without inducing permanent reproductive sterility. It has been found that when compositions containing the above-described active components were orally administered at sufficient dosage described hereinafter for 10 days to adult female rats which were cohabited with fertile male rats, pregnancy was prevented in all instances. Moreover, no accompanying maternal lethality was observed.

Accordingly, this invention includes within its scope the new compositions of matter for the control of mammalian female sexual reproduction and to methods of their administration. It is indicated that the favorable results achieved in rats with these compositions will relate to similar effects in other mammals as well. The novel compositions, therefore, are potentially useful for the control of female sexual reproduction in warmblooded animals including domestic animals such as cattle, sheep and pigs and pest animals such as, for example, rats, weasels, foxes, etc.

There are several points of contraceptive attack during the normal processes of mammalian female reproduction. These points include ovulation blockade, interference with the fertilization of the ovum by sperm, interference with the normal transport of ova and/or zygotes in the reproductive tract, prevention of embryo implantation disruption of the maternal response to embryonic implantation, and maternal failure to support embryonic survival. While the exact mechanism or mechanisms which take place with the active ingredient in effecting contraception is not clear, it is known that the compositions of this invention prevent conception by one or more of the above-mentioned occurrences It is not intended, however, that the present invention be limited to any particular theory as to mechanism of contraception.

While the method of administering the active component of the novel therapeutic compositions of the present invention is not limited to oral administration alone, a decided practical advantage of the invention is that the active ingredient may be administered orally in any convenient manner. This however, does not preclude the used of the present compositions intraperitoneally or by other nonoral means. The compound, preferably, may be taken orally, for example, with an inert diluent or with an assimilable edible carrier, or by use of a pharmaceutically acceptable carrier compressed into tablets, or enclosed in hard or soft gelatin capsules. Other compositions include, for example, suspensions, syrups, elixirs, emulsions, wafers, chewing gum or the like. Obviously, in addition to the therapeutic active ingredient there may be present excipients, binders, fillers and other inert ingredients necessary in the formulation of the desired pharmaceutical compositions. Preferred compositions or preparations according to the present invention are prepared so that a dosage unit form contains between about 0.005 milligrams and about 200 milligrams of the active component. These dosage unit forms may be administered one or more times per day, on a daily basis, during the period antifertility effect is desired.

The amount of a single dose or of a daily dose to produce the desired level of efficacy should be such as to give a proportionate dosage of from about 0.0009 mg. to 10 mg./kg./day of active component. In terms of total weight of active component the daily dosage for warmblooded animals of, for example, 60 kilograms would amount to from about 0.05 mg. to 60 mg. The dosage regimen may be adjusted to provide optimum response with the least amount of active ingredients.

The following examples illustrate the method of administering the novel compositions of this invention their antifertility effect in female rats, preparation of some of the compounds and also various formulations for oral administration.

EXAMPLE 1

Adult Wistar strain rats, maintained on a standard diet of laboratory rat pellets and water, ad libitum, are used. Graded doses of $9\alpha, 11\beta, 21$-trichloro-$16\alpha, 17\alpha$-isopropylidenedioxypregna-1,4, 6-triene-3,20-dione are orally administered once daily for 10 days to female rats. The composition is composed of propylene glycol and an appropriate amount of active ingredient so that the desired dose is given in a 0.25-ml. volume. Control rats are given propylene glycol without the active ingredients. From the first day of treatment, the females are placed with fertile males in a ratio of four females to three males. Four days after the last dose the females were sacrificed and autopsied and uterine fetal implantation sites were counted. Results of this study are given in table I below:

TABLE I

| Dose, mg./kg./day | No. Rats Pregnant/ No. Rats Treated |
| --- | --- |
| 0.005 | 3/7 |
| 0.01 | 3/6 |
| 0.02 | 0/15 |
| 0.10 | 0/15 |
| 0.25 | 0/7 |
| 0.50 | 0/8 |
| 1.0 | 0/7 |
| 3.0 | 0/4 |

EXAMPLE 2

Following the procedure set forth in example 1 and using 9α, 11β, 21-trichloro-16α, 17α-isopropylidenedioxypregna-1,4-diene-3,20-dione as the antifertility agent, the following results are obtained.

TABLE II

| Dose, mg./kg./day | No. Rats Pregnant/ No. Rats Treated |
| --- | --- |
| 0.001 | 7/7 |
| 0.005 | 5/5 |
| 0.01 | 5/7 |
| 0.02 | 5/7 |
| 0.05 | 0/4 |
| 1.0 | 0/4 |
| 2.0 | 0/4 |
| 4.0 | 0/4 |
| 5.0 | 0/4 |

EXAMPLE 3

Using the procedure set forth in example 1 and 9α, 11β-dichloro-16α, 17α-isopropylidenedioxypregna-1,4-diene-3,20-dione as the antifertility agent, the following results are obtained.

TABLE III

| Dose, mg./kg./day | No. Rats Pregnant/ No. Rats Treated |
| --- | --- |
| 0.02 | 6/8 |
| 0.10 | 8/8 |
| 0.25 | 4/6 |
| 0.50 | 4/6 |
| 1.00 | 4/8 |

EXAMPLE 4

Following the procedure set forth in example 1 and using 21-chloro-16α, 17α-isopropylidenedioxypregna-1,4,6,9(11)-tetraene-3,20-dione as the antifertility agent, the following results are obtained.

TABLE IV

| Dose, mg./kg./day | No. Rats Pregnant/ No. Rats Treated |
| --- | --- |
| 0.02 | 6/7 |
| 0.10 | 4/4 |
| 0.25 | 7/8 |
| 0.50 | 8/8 |
| 1.0 | 6/8 |
| 3.0 | 0/4 |

EXAMPLE 5

When the procedure set forth in example 1 is used and 9α, 11β, 21-trichloro-16α, 17αisopropylidenedioxypregn-4-ene-3,20-dione is the antifertility agent, the following results are obtained

TABLE V

| Dose, mg./kg./day | No. Rats Pregnant/ No. Rats Treated |
| --- | --- |
| 0.10 | 2/3 |
| 0.30 | 1/3 |
| 1.0 | 2/4 |
| 3.0 | 0/4 |

EXAMPLE 6

Preparation of 9α, 11β, 21-Trichloro-16α, 17αdihydroxypregna-1,4,6-triene-3,20α-dione A solution of 145 mg. of 9α, 11β, 21-trichloro-16α, 17α-isopropylidenedioxypregna-1,4,6-triene-3,20-dione in 5.5 ml. of 70 percent formic acid is refluxed for 2 hours. The resultant solution is poured into ice water and the mixture is filtered. The residue is recrystallized from acetone-hexane to give 9α, 11β, -21-trichloro-16α, 17α-dihyroxypregna-1,4,6-triene-3,20-dione.

EXAMPLE 7

Preparation of Actophenide derivative of 9α, 11β, 21-trichloro-16α, 17α1, 4, 6

To a suspension of 100 mg. of 9α, 11β, 21-trichloro-16α, 17α-dihydroxypregna-1,4,6-triene-3,20-dione, the product of example 6 in 20 ml. of freshly redistilled actophenone is added 0.1 ml. of 72 percent perchloric acid and the mixture is stirred at room temperature for 2 hours, during which time complete solution is effected. The solution is neutralized with sodium bicarbonate solution, water and methylene chloride is added. The organic layer is concentrated in high vacuum. The residue is crystallized from acetone-hexane to give the acetophenide derivative of 9α, 11β, 21-trichloro-16α, 17α-dihydroxypregna-1,4,6-triene-3,20-dione.

EXAMPLE 8

Preparation of 16α, 17α-(2'Butylideneioxy)-9α, 11β, 21-trichloro-pregna-1,4,6-triene-3,20-dione To a suspension of 100 mg. of 9α, 11β, 21-trichloro-16α-17α-dihydroxypregna-1,4,6-triene-3,20-dione, the product of example 6, in 15 ml. of methylethylketone is added 0.05 ml. of 72 percent perchloric acid and the mixture stirred at room temperature 2 hours. The resultant solution is neutralized with sodium bicarbonate solution and after addition of water, the methylethylketone is evaporated under reduced pressure. The resultant filtered crystals are 16α, 17α-(2'-butylenedioxy)-9α, 11β, 21-trichloropregna-1,4,6-triene-3,20-dione.

EXAMPLE 9

| Hard Gelatin Capsules | Grams |
| --- | --- |
| 9α,11β,21-Trichloro-16α17α-isopropylidenedioxypregna-1,4-diene-3,20-dione | 3 |
| Cornstarch | 1,977 |
| Magnesium stearate, powder | 10 |
| Talc | 10 |

The finely divided ingredients are mixed thoroughly and then encapsulated in 10,000 two-piece hard gelatin capsules each containing 0.3 mg. of 9α, 11β, 21-trichloro-16α, 17β-isopropylidenedioxypregna-1,4-diene-3,20-dione.

EXAMPLE 10

Twenty thousand tablets each containing 0.05 mg. of 9α, 11β, h21-trichloro-16α, 17α-isopropylidenedioxypregna-1,4,6-triene-3,20-dione are prepared from the following ingredients:

|  | Grams |
| --- | --- |
| 9α, 11β, 21-trichloro-16α,-17α-isopropylidenedioxy-pregna-1,4,6-triene-3,20-dione | 1 |
| Lactose | 3,719 |
| Starch 200 | |
| Calcium stearate | 40 |
| Talc | 40 |

EXAMPLE 11

Soft Gelatin Capsules

Five hundred one-piece soft gelatin for oral use each containing 90 mg. of 9α, 11β-dichloro-16α, 17α-isopropylidenedioxypregna-1,4-diene-3,20-dione are prepared by first dispersing 45 grams of the compound in sufficient corn oil to render the material capsulatable and then encapsulating in the usual manner.

EXAMPLE 12

Using the formulation of example 9 and 3 g. of the acetophemide derivative of 9α, 11β, 21-trichloro-16α, 17α-dihydroxypregna-1,4,6-triene-3,20-dione as the active component, capsules are obtained which contain 0.3 mg. each.

We claim:

1. A method for controlling fertility in warmblooded female animals which comprises orally administering to said animals a contraceptively effective amount of 9α, 11β, 21-trichloro-16α, 17α-isopropylidenedioxypregna-4-ene3,20-dione and a pharmaceutically acceptable carrier.

2. A method for controlling fertility in warmblooded female animals which comprises orally administering to said animals a contraceptively effective amount of 9α, 11β21-trichloro-16α, 17α-isopropylidenedioxypregna-1,4-diene-3,20-dione and a pharmaceutically acceptable carrier.

3. A method for controlling fertility in warmblooded female animals which comprises orally administering to said animals a contraceptively effective amount of 9α, 11β, 21-trichloro-16α, 17α-isopropylidenedioxypregna-1,4,6-triene-3,20-dione and a pharmaceutically acceptable carrier.

4. A method for controlling fertility in warmblooded female animals which comprises orally administering to said animals a contraceptively effective amount of 9α-chloro-16α17α-isopropylidenedioxypregna-1, 4, 6, 9 (11)tetraene-3,20-dione and a pharmaceutically acceptable carrier.